United States Patent
Virnelson et al.

(12)
(10) Patent No.: US 6,309,985 B1
(45) Date of Patent: Oct. 30, 2001

(54) FORMABLE CONSTRAINING LAYER SYSTEM

(75) Inventors: R. Craig Virnelson, Chesterland; Jeffrey J. Schroeder, Cleveland; Maurice E. Wheeler, Ashtabula, all of OH (US)

(73) Assignee: Soundwich, Inc., Cleveland, OH (US)

( * ) Notice: Subject to any disclaimer, the term of this patent is extended or adjusted under 35 U.S.C. 154(b) by 0 days.

(21) Appl. No.: 09/237,606

(22) Filed: Jan. 25, 1999

Related U.S. Application Data

(60) Provisional application No. 60/072,600, filed on Jan. 26, 1998.

(51) Int. Cl.[7] ............................ B32B 27/04; B32B 27/12; B32B 5/02
(52) U.S. Cl. ..................... 442/104; 442/173; 442/175; 442/327; 442/328; 442/374; 442/375
(58) Field of Search .......................... 442/104, 71, 72, 442/74, 173, 175, 327, 328, 374, 375

(56) References Cited

U.S. PATENT DOCUMENTS

| | | |
|---|---|---|
| 4,311,751 | 1/1982 | Brueggemann et al. . |
| 4,766,028 * | 8/1988 | Rich ..................................... 428/253 |
| 4,803,105 | 2/1989 | Kretow et al. . |
| 4,842,938 | 6/1989 | Rizk et al. . |
| 5,160,783 | 11/1992 | Nemoto et al. . |
| 5,487,928 | 1/1996 | Fujimoto . |
| 5,578,800 * | 11/1996 | Kijima .................................. 181/171 |
| 5,858,521 * | 1/1999 | Okuda et al. ........................ 428/219 |

OTHER PUBLICATIONS

Thiokol Propulsion, TCR™ (Composite Resin System), 1998, pp. 1–7.

* cited by examiner

Primary Examiner—Terrel Morris
Assistant Examiner—Norca L. Torres
(74) Attorney, Agent, or Firm—Pearne & Gordon LLP

(57) ABSTRACT

A vibration-damping laminate having a constraining layer secured to a viscoelastic layer. The constraining layer includes a mat of non-thermoplastic fibers. The viscoelastic layer includes a thermoplastic elastomer.

16 Claims, 1 Drawing Sheet

FORMABLE CONSTRAINING LAYER SYSTEM

CROSS-REFERENCE TO RELATED APPLICATION

This application claims the benefits of U.S. Provisional Application No. 60/072,600, filed Jan. 26, 1998.

BACKGROUND OF THE INVENTION

This invention relates to vibration-damping materials, and in particular to vibration-damping laminates having constraining layers.

A structure that is under the influence of internal and/or external forces, such as an automobile panel, tends to vibrate and produce undesirable noise. It is known to reduce the vibration of the structure by attaching a vibration-damping material to the structure. The vibration-damping material often consists of a single layer of a viscoelastic material, such as asphalt or rubber. It has been found particularly useful, however, to use a laminate as the vibration-damping material, wherein the laminate includes a viscoelastic layer and a constraining layer with a high Young's modulus. Such a constraining layer increases the damping effect of the laminate, and supports and protects the viscoelastic layer and the structure. Conventionally, the constraining layer is composed of metal because metal has a high Young's modulus.

Although a laminate with a metal constraining layer provides numerous advantages, such a laminate also has disadvantages. A laminate with a metal constraining layer has increased weight, is harder to shape, is more expensive to produce, and is usually more expensive to install.

Based upon the foregoing, there is a need in the art for an improved vibration-damping laminate. The present invention is directed to such a laminate.

SUMMARY OF THE INVENTION

It therefore would be desirable, and is an advantage of the present invention, to provide a vibration-damping laminate having a constraining layer that includes non-thermoplastic fibers. A viscoelastic layer is secured to the constraining layer. In one embodiment, the viscoelastic layer includes a thermoplastic elastomer. In another embodiment, the viscoelastic layer includes a blowing agent.

Also provided in accordance with the present invention is a method of damping a structure having a surface with a depression formed therein. A laminate is provided that includes a constraining layer secured to a viscoelastic layer. The constraining layer includes non-thermoplastic fibers. The viscoelastic layer includes a thermoplastic elastomer and a blowing agent. The viscoelastic layer is secured to the surface of the structure, over the depression. The laminate is then heated to activate the blowing agent, thereby causing the viscoelastic layer to expand into the depression.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS OF THE INVENTION

It should be noted that parts are parts by weight and percents are weight percents unless otherwise indicated or apparent. In addition, when a preferred range such as 5–25 is given, this means preferably at least 5 and preferably not more than 25.

As used herein, the term "thermoplastic" means capable of being repeatedly softened by an increase in temperature and hardened by a decrease in temperature.

As used herein, the term "thermoset resin" means a polymer resin that, when cured by application of heat or chemical means, changes into a substantially infusible and insoluble material.

As used herein a "prepreg" is a ready-to-mold material in sheet form that includes a layer of cloth, mat, fiber, or paper, impregnated with resin.

Figure 1:
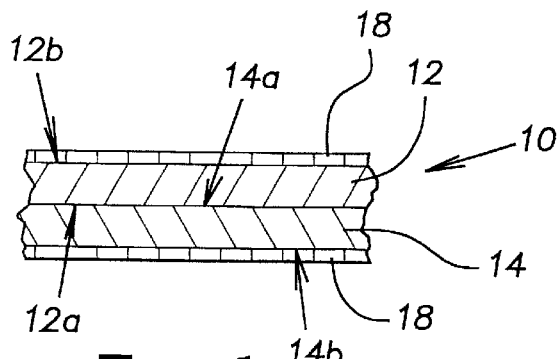
FIG. 1 shows a schematic view in cross-section of a laminate.
Figure 2:
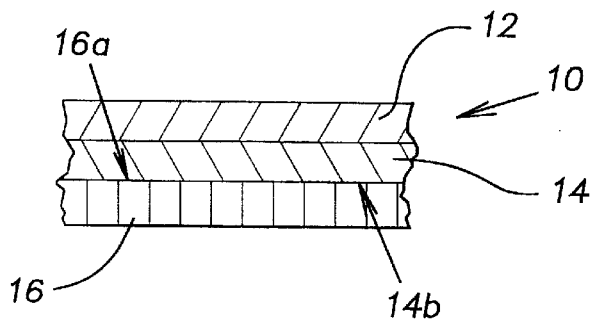
FIG. 2 shows a schematic view in cross-section of the laminate secured to a structure.

Referring now to FIGS. 1 and 2, there is shown a vibration-damping laminate 10 embodied in accordance with the present invention. The laminate 10 is for attachment to a surface 16a of a structure 16, such as an automobile panel (typically metal or plastic). The laminate 10 comprises a constraining layer 12 with first and second surfaces 12a, 12b, and a viscoelastic layer 14 with first and second surfaces 14a, 14b. The first surface 12a of the constraining layer 12 is secured to the first surface 14a of the viscoelastic layer 14. Release liners 18 may be releasably secured to the second surfaces 12b, 14b of the constraining layer 12 and the viscoelastic layer 14 during storage of the laminate 10, prior to usage.

Preferably, the constraining layer 12 is comprised of a mat or layer of fibers impregnated with a resin or other matrix material. Preferably, the constraining layer 12 is 10–40% by weight resin, with the remainder being fibers. In addition, the constraining layer 12 preferably has a weight of 10–50, more preferably 15–30, more preferably about 20, ounces per square yard.

Preferably, the fibers are non-thermoplastic fiberglass fibers, carbon fibers, aramid fibers, keviar fibers, ceramic fibers, or combinations thereof. Less preferably, the fibers are other synthetic fibers. The fibers may be woven or unwoven, but are preferably orientated in a plurality of directions.

Preferably, the resin is an epoxy resin. A heat-reactive curing agent may be mixed into the resin. suitable epoxy resins include bisphenol A-based epoxy resins, bisphenol F-based epoxy resins, epoxodized novolac resins, and cycloaliphatic epoxides. Suitable curing agents include dicyandiamide, Lewis acids, and amine salts. Less preferably, the resin is another thermoset resin, or a thermoplastic resin. Suitable thermoset resins include: crosslinked polyester resins, phenolic resins, ureaformaldehyde resins, and polyurethane resins.

Preferably, the constraining layer 12 is a prepreg sold by Thiokol Propulsion under the trade name TCR, and includes heavy weight glass fiber sold under the trade name E-Glass, and an epoxy resin (with a heat sensitive curing agent) sold under the trade name UF3325; the resin content being about 34.5 percent (%).

In lieu of being a mat or layer of fibers impregnated with a resin, the constraining layer 12 may less preferably be comprised of a weave of non-thermoplastic fibers and thermoplastic fibers that is not impregnated with a resin binder or matrix, such a weave hereinafter being referred to as a "resinless weave". Preferably each strand in the resinless weave has non-thermoplastic fibers commingled with thermoplastic fibers. The non-thermoplastic fibers may be composed of non-thermoplastic fiberglass fibers, carbon fibers, aramid fibers, kevlar fibers, ceramic fibers, or combinations thereof. Preferably, the thermoplastic fibers comprise 10–40% by weight of the resinless weave.

When the resinless weave is heated, such as by baking, the thermoplastic fibers melt around the non-thermoplastic fibers. Upon cooling, the thermoplastic fibers solidify, thereby forming a solid matrix that encases the non-thermoplastic fibers. A preferred resinless weave is Twintex T44EP (e-glass and polypropylene, 44 ounces per square yard) or other Twintex product from Vetrotex CertainTeed Company. The resinless weave is preferably 10–50, more preferably 15–30, more preferably about 20, ounces per square yard.

The viscoelastic layer 14 is preferably comprised of a thermoplastic elastomer. The preferred formulation (Formulation 1) for the viscoelastic layer 14 is as follows:

Formulation 1

| | Weight Percent | | |
|---|---|---|---|
| Component | Preferred | Less Preferred | Less Preferred |
| 1. Thermoplastic elastomer "A" | 13 | 12–14 | 9–16 |
| 2. Thermoplastic elastomer "B" | 31 | 28–34 | 21–39 |
| 3. Filler | 5 | 2–10 | 0–15 |
| 4. Plasticizer | 3 | 1–4 | 0–5 |
| 5. Adhesion promoter "A" | 48 | 45–55 | 35–65 |

Less preferably, the viscoelastic layer 14 has the following formulation (Formulation 2):

Formulation 2

| | Weight Percent | | |
|---|---|---|---|
| Component | Preferred | Less Preferred | Less Preferred |
| 1. Thermoplastic elastomer "A" | 8 | 2–12 | 0–16 |
| 2. Thermoplastic polymer | 25 | 20–30 | 5–50 |
| 3. Filler | 47 | 40–55 | 30–70 |
| 4. Asphalt | 12 | 7–18 | 4–24 |
| 5. Adhesion promoter "A" | 8 | 5–10 | 4–10 |

Less preferably, the viscoelastic layer 14 has the following formulation (Formulation 3):

Formulation 3

| | Weight Percent | | |
|---|---|---|---|
| Component | Preferred | Less Preferred | Less Preferred |
| 1. Butyl rubber | 14 | 8–20 | 7–25 |
| 2. Isoprene | 4 | 0–8 | 0–12 |
| 3. Filler | 55 | 45–65 | 30–70 |
| 4. Plasticizer | 18 | 15–25 | 15–30 |
| 5. Adhesion promoter "B" | 9 | 7–15 | 6–20 |

If the laminate 10 is to be secured to a surface that is not smooth, but is pitted with crevices, dents, depressions, recesses, etc. or is otherwise not a smooth, flat surface or if gaps or spaces will be left between the laminate 10 and the surface, it has been found advantageous to formulate the viscoelastic layer 14 to expand into the crevices, dents, depressions, recesses, gaps, spaces, etc. using a blowing agent. In such event, the viscoelastic layer 14 has the following preferred formulation (Formulation 4):

Formulation 4

| | Weight Percent | | |
|---|---|---|---|
| Component | Preferred | Less Preferred | Less Preferred |
| 1. Thermoplastic elastomer "A" | 8 | 2–12 | 0–16 |
| 2. Thermoplastic polymer | 25 | 20–30 | 5–50 |
| 3. Filler | 45 | 38–53 | 28–70 |
| 4. Asphalt | 12 | 7–18 | 4–24 |
| 5. Blowing agent | 2 | 1–2.5 | 0.1–5 |
| 6. Adhesion promoter "A" | 8 | 5–10 | 4–10 |

In Formulations 1, 2, and 4, the thermoplastic elastomer "A" is preferably a styrene-isoprene block copolymer sold by the Kuraray Company under the trade name VS-1. Less preferably, thermoplastic elastomer "A" is a linear styrene-isoprene-styrene block copolymer sold by the Shell Chemical Company under the trade name Kraton D 1107. Still less preferably, thermoplastic elastomer "A" is another styrene copolymer sold by the Shell Chemical Company under the "Kraton" family of trade names. Still less preferably, the thermoplastic elastomer "A" is another commercially available thermoplastic elastomer or rubber.

In Formulation 1, the thermoplastic elastomer "B" is Kraton D 1107. Still less preferably, thermoplastic elastomer "B" is another styrene copolymer sold by the Shell Chemical Company under the "Kraton" series of trade names. Still less preferably, the thermoplastic elastomer "B" is another commercially available thermoplastic elastomer or rubber.

In Formulations 2 and 4, the thermoplastic polymer is preferably an ethylene and vinyl acetate copolymer (EVA). Less preferably, the thermoplastic polymer is a polyvinyl acetate, a polyethylene, an amorphous polypropylene, or another commercially available thermoplastic polymer.

In Formulations 1–4, the filler is preferably calcium carbonate ($CaCO_3$). Less preferably, the filler is carbon black, titanium dioxide, clay, talc, mica, glass microbubbles, fumed silica, or other commercially available fillers.

In Formulation 4, the blowing agent is preferably azodicarbonamide. Less preferably, the blowing agent is 4,4'- oxybis(benzenesulfohydrazide); diphenylsulfone-3,3'-disulfohydrazide; diphenylene oxide -4,4'-disulfohydrazide; or another commercially available blowing agent.

In Formulations 1 and 3, the plasticizer is preferably polybutene.

In Formulations 1, 2, and 4, the adhesion promoter "A" is preferably a modified polyterpene hydrocarbon resin sold by the Goodyear Tire & Rubber Company under the trade name Wingtac 86. Less preferably, the adhesion promoter "A" is another terpene or polyterpene hydrocarbon resin sold by the Goodyear Tire & Rubber Company under the "Wingtac" series of trade names.

In Formulation 3, the adhesion promoter "B" is preferably a hydrocarbon resin sold by the Exxon Chemical Company under the "Esco Rez" series of trade names.

In Formulation 1, the thermoplastic elastomer "A", the thermoplastic elastomer "B", the filler, the plasticizer, and the adhesion promoter "A" are blended together at ambient temperature, pelletized at a temperature of about 350° F., and extruded as a sheet using customary and known methods to form the viscoelastic layer 14.

In Formulation 2, the thermoplastic elastomer "A", the thermoplastic polymer, the filler, the asphalt, and the adhesion promoter "A" are blended together at ambient temperature, pelletized at a temperature of about 350° F., and extruded as a sheet using customary and known methods to form the viscoelastic layer 14.

In Formulation 3, the butyl rubber, the isoprene, the filler, the plasticizer, and the adhesion promoter "B" are blended together at ambient temperature, pelletized at a temperature of about 350° F., and extruded as a sheet using customary and known methods to form the viscoelastic layer 14.

In Formulation 4, the thermoplastic elastomer "A", the thermoplastic polymer, the filler, the asphalt, and the adhesion promoter "A" are blended together at ambient temperature, and pelletized at a temperature of about 350° F. to form resin pellets. The resin pellets and pellets of the blowing agent are then mixed and extruded as a sheet using customary and known methods to form the viscoelastic layer 14.

The viscoelastic layer 14 is formed to have a thickness of preferably 10–80 mil, more preferably 30–60 mil or 40–80 mil, and still more preferably about 30 mil, or about 60 mil.

Formulation 4, which has the blowing agent, expands when heated. Preferably, the viscoelastic layer 14 of Formulation 4 will expand to increase the thickness of the viscoelastic layer 14 by about an additional 150 percent (%). For example, if the viscoelastic layer 14 is initially extruded to be 20 mils thick, and is subsequently heated so as to expand 150%, the viscoelastic layer 14 will have a final thickness of 50 mils. Thus, the viscoelastic layer 14 of Formulation 4 is preferably initially extruded in an unexpanded condition to be about 10–40 mil thick, and is then expanded through heating to be about 10–80 mil thick, more preferably 30–60 mil thick, or 40–80 mil thick, still more preferably about 30 mil thick, or about 60 mil thick.

The laminate 10 is produced by extruding the viscoelastic layer 14 as a sheet onto the constraining layer 12 such that the first surface 14a of the viscoelastic layer 14 contacts the first surface 12a of the constraining layer 12. The viscoelastic layer 14 and the constraining layer 12 are then pressed together using rollers or other compressing means. If the viscoelastic layer 14 is formed pursuant to Formulation 1, the viscoelastic layer 14 is pressure sensitive and the first surface 14a of the viscoelastic layer 14 readily adheres to the first surface 12a of the constraining layer 12. If the viscoelastic layer 14 is formed pursuant to Formulations 2–4, a pressure sensitive adhesive (preferably 2–5 mil thick) may have to be inserted between the constraining layer 12 and the viscoelastic layer 14 before the constraining layer 12 and the viscoelastic layer 14 are pressed together.

The release liners 18 may be releasably secured to the second surfaces 12b, 14b of the constraining layer 12 and the viscoelastic layer 14 during storage of the laminate 10, prior to usage. Preferably, the release liners 18 are composed of a material that does not bond to epoxy resins and thermoplastic adhesives, such as cellophane, silicone-coated plastic or paper, polyethylene, polyvinyl chloride, and metals, such as aluminum. In this manner, the release liners 18 may be facilely removed from the constraining layer 12 and the viscoelastic layer 14.

In order to secure the laminate 10 to the structure 16, the release liner 18 on the second surface 14b of the viscoelastic layer 14 is first removed. The second surface 14b of the viscoelastic layer 14 is then pressed against the surface 16a of the structure 16. Once again, if the viscoelastic layer 14 is formed pursuant to Formulation 1, the viscoelastic layer 14 is pressure sensitive and the second surface 14b of the viscoelastic layer 14 should readily adhere to the surface 16a of the structure 16. If the viscoelastic layer 14 is formed pursuant to Formulations 2–4, a pressure sensitive adhesive (preferably 2–5 mil thick) may have to be inserted between the structure 16 and the viscoelastic layer 14 before the viscoelastic layer 14 is pressed against the structure.

Once the laminate 10 is secured to the structure 16, the release liner 18 on the second surface 12b of the constraining layer 12 is removed. The resin in the constraining layer 12 may then be cured by heating, or may be left uncured. Surprisingly, it has been found that the constraining layer 12 has substantially the same sound damping properties when the resin is uncured as when the resin is cured. Thus, the resin of the constraining layer 12 may be left uncured, thereby eliminating the need to heat the laminate 10. It may be desirable, however, to cure the resin in the constraining layer 12 if the laminate 10 is being used to support or reinforce the structure 16, or if it is likely that the laminate 10 will be contacted by other structures, or by humans.

If it is desired to cure the resin in the constraining layer 12, the constraining layer 12 must be subjected to heat, such as in a bake cycle of an auto body. Preferably, the resin of the constraining layer 12 is cured at a temperature of about 270° F. for about 4 hours, or at a temperature of about 290° F. for about 2 hours, or at a temperature of about 310° F. for about 1 hour, or at a temperature of about 356° F. for about 10 minutes or at temperatures and times therebetween.

Figure 3:
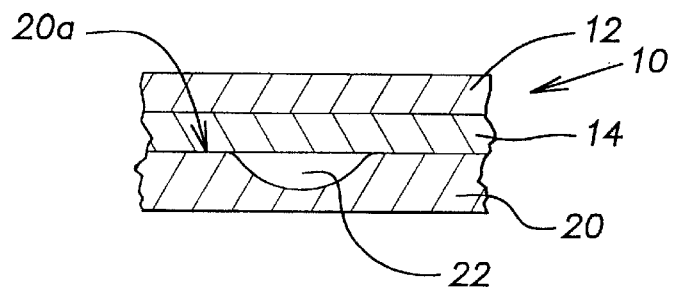
FIG. 3 shows a schematic view in cross-section of the laminate secured to a second structure with a depression.
Figure 4:
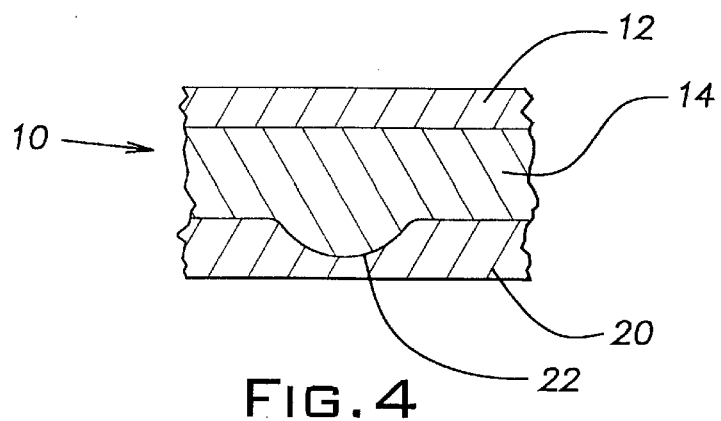
FIG. 4 shows a schematic view in cross-section of the laminate expanded to extend into the depression.

Referring now to FIG. 3, the laminate 10 may be used to damp a second structure 20 having a surface 20a with a depression 22 formed therein. In this application, it has been found useful to have the constraining layer 12 comprised of the resinless weave, and the viscoelastic layer 14 to be formed pursuant to Formulation 4. As shown in FIG. 3, the viscoelastic layer 14 is secured to the surface 20a, over the depression 22. Initially, the viscoelastic layer 14 is not expanded and does not fill the depression 22. The laminate 10 is then heated, such as in an oven. The viscoelastic layer 14 expands and fills the depression 22, as shown in FIG. 4. The laminate 10 is then allowed to cool. As a result of the heating and cooling of the laminate 10, the thermoplastic fibers of the constraining layer 12 melt and solidify to form a solid matrix encasing the non-thermoplastic fibers.

The structures 16, 20 to which the laminate 10 may be secured may be automobile components, such as fenders, hoods, and floor, roof and door panels; housing material for use in walls, roofs, floors, and doors; enclosures for heating/ cooling systems and other machinery; tanks; pipes; and other structures which need vibration damping. The structures 16, 20 may be composed of metal, plastic, wood, or other materials.

The laminate 10 of the present invention provides numerous benefits. The laminate 10 has been found to effectively damp vibration and helps support and reinforce structures.

The following Examples further illustrate various aspects of the invention. Unless otherwise indicated, the ingredients are combined using methods known in the art or as described above.

EXAMPLES

The Loss Factor of a damping system provides a measure of the effectiveness of the damping system in reducing vibration. Loss Factors at 200 Hz over a given temperature range are typically used to compare different damping systems. The temperature range is typically selected to approximate the actual conditions that the damping systems will be used at. The Loss Factor, at 200 Hz, is an interpolated value calculated from the measured Loss Factors on the first mode on either side of 200 Hz.

In the Examples that follow, Loss Factors were measured using the Oberst test procedure as described by SAE J1367, with the following parameters:

Test bars to be 300×20×0.76 mm
Constrained layer thickness to be 0.76 mm
"baked" for 10 minutes at 356° F.

The last parameter was used in Example 2 to heat the blowing agent in the viscoelastic layers of the third and fourth laminates, and to cure the resin in the fourth laminate. Examples 1 and 2 were performed to compare the vibration damping of laminates with non-metallic constraining layers to the vibration damping of laminates with metal constraining layers.

It should be noted that Oberst testing has an error of 30%, much of which is dependent on sample preparation.

Example 1

A first laminate was prepared having a viscoelastic layer secured to a constraining layer of 0.76 mm thick sheet steel. A second laminate was prepared having a viscoelastic layer secured to a constraining layer comprised of unreacted, uncured Thiokol TCR prepreg described above, at about 20 oz/square yard. In both the first and second laminates, the viscoelastic layer was formed in accordance with Formulation 1 and was 0.030 were each secured to a panel of 0.76 mm thick sheet steel. The Loss Factors for the first and second laminates were then measured over a temperature range of 15–45° C. with the following results:

| Temperature (° C.) | Loss Factor First Laminate | Loss Factor Second Laminate |
|---|---|---|
| 15 | 0.25 | 0.18 |
| 23 | fully damped | 0.30 @ 92 Hz |
| 30 | fully damped | 0.49 @ 72 HZ |
| 45 | 0.31 | 0.35 |

As shown, the Loss Factor for the second laminate at 15° C. is less than for the first laminate, but is greater at 45° C. and is close at the other temperatures.

Example 2

A third laminate was prepared having a viscoelastic layer secured to a constraining layer of 0.76 mm thick sheet steel. A fourth laminate was prepared having a viscoelastic layer secured to a constraining layer comprised of Thiokol TCR prepreg described above, at about 20 oz/square yard, wherein the resin in the constraining layer was reacted and cured by heating to harden the constraining layer. In both the third and fourth laminates, the viscoelastic layer was formed in accordance with Formulation 4, and was expanded 150% by heating to yield an expanded thickness of about 55–60 mil. The third laminate and the fourth laminate were each secured to a panel of 0.76 mm thick sheet steel. The Loss Factors for the third and fourth laminates were then measured over a temperature range of 15–60° C. with the following results:

| Temperature (° C.) | Loss Factor Laminate 3 | Loss Factor Laminate 4 |
|---|---|---|
| 15 | 0.12 | 0.14 |
| 30 | 0.34 | 0.42 @ 92 Hz |
| 45 | 0.25 | 0.56 |
| 60 | 0.12 | 0.24 |

As shown, the Loss Factor for the fourth laminate is better at all temperatures than the third laminate.

As shown in Examples 1 and 2, the overall performance of laminates with the constraining layer of the present invention is better than laminates with metal constraining layers.

While the invention has been shown and described with respect to particular compositions thereof, those compositions are for the purpose of illustration rather than limitation, and other variations and modifications of the specific compositions herein described will be apparent to those skilled in the art, all within the intended spirit and scope of the invention. Accordingly, the invention is not to be limited in scope and effect to the specific compositions herein described, nor in any other way that is inconsistent with the extent to which the progress in the art has been advanced by the invention.

What is claimed is:

1. A vibration-damping laminate comprising:
   a constraining layer comprising non-thermoplastic fibers; and
   a viscoelastic layer secured to the constraining layer, said viscoelastic layer comprising a thermoplastic elastomer, said thermoplastic elastomer being a styrene-isoprene copolymer.

2. The vibration-damping laminate according to claim 1, wherein the constraining layer further comprises thermoplastic fibers commingled with the non-thermoplastic fibers.

3. The vibration-damping laminate according to claim 1, wherein the constraining layer further comprises a thermoset resin.

4. The vibration-damping laminate according to claim 3, wherein the thermoset resin is an epoxy resin; and
   wherein said non-thermoplastic fibers form a fiber mat, said fiber mat being impregnated with said thermoset resin.

5. The vibration-damping laminate of claim 4, wherein the thermoset resin comprises about 10–40 weight percent of the constraining layer.

6. The vibration-damping laminate according to claim 4, wherein said viscoelastic layer further comprises filler and an adhesion promoter.

7. The vibration-damping laminate according to claim 1, wherein the viscoelastic layer further comprises asphalt.

8. The vibration-damping laminate according to claim 1, wherein the viscoelastic layer further comprises a blowing agent.

9. The vibration-damping laminate according to claim 6, wherein the viscoelastic layer further comprises a plasticizer.

10. The vibration-damping laminate of claim 1, wherein said viscoelastic layer is about 40–48 weight percent styrene-isoprene copolymer;

wherein said viscoelastic layer is about 2–10 weight percent filler;

wherein said viscoelastic layer is about 1–4 weight percent plasticizer; and wherein said viscoelastic layer is about 45–55 weight percent adhesion promoter.

11. A vibration-damping laminate according to claim 1, wherein styrene-isoprene copolymer comprises at least 9 weight percent and not more than 55 weight percent of the viscoelastic layer.

12. A vibration-damping laminate according to claim 1, wherein said constraining layer comprises a resinless weave of non-thermoplastic fibers and thermoplastic fibers.

13. The vibration-damping laminate of claim 12, wherein said viscoelastic layer further comprises asphalt.

14. The vibration-damping laminate according to claim 12, wherein said resinless weave consists essentially of glass fibers and Polypropylene.

15. The vibration-damping laminate according to claim 12, wherein styrene-isoprene copolymer makes up at least 9 weight percent and not more than 55 weight percent of the viscoelastic layer.

16. A vibration-damping laminate according to claim 12, wherein said viscoelastic layer further comprises a blowing agent.

* * * * *